US009023162B2

(12) United States Patent
McCormick et al.

(10) Patent No.: US 9,023,162 B2
(45) Date of Patent: May 5, 2015

(54) METHOD OF MANUFACTURING A WINDSHIELD HAVING A PROTECTIVE LAMINATE

(75) Inventors: Chris E. McCormick, Draper, UT (US); A. Brent Strong, Sandy, UT (US); Mike D. Ridges, American Fork, UT (US); Kevin A. Plumb, Sandy, UT (US); Jeff Smith, Draper, UT (US)

(73) Assignee: Clearplex Corporation, Draper, UT (US)

( * ) Notice: Subject to any disclaimer, the term of this patent is extended or adjusted under 35 U.S.C. 154(b) by 1460 days.

(21) Appl. No.: 12/111,537

(22) Filed: Apr. 29, 2008

(65) Prior Publication Data

US 2008/0206522 A1    Aug. 28, 2008

Related U.S. Application Data

(62) Division of application No. 10/993,619, filed on Nov. 19, 2004, now abandoned.

(60) Provisional application No. 60/523,966, filed on Nov. 21, 2003, provisional application No. 60/552,784, filed on Mar. 12, 2004.

(51) Int. Cl.
*B32B 37/00* (2006.01)
*B60J 1/20* (2006.01)
(Continued)

(52) U.S. Cl.
CPC ......... *B60J 1/2094* (2013.01); *B32B 17/10009* (2013.01); *B32B 2367/00* (2013.01);
(Continued)

(58) Field of Classification Search
CPC .. B32B 17/08; B32B 17/10; B32B 17/10009; B32B 17/10018; B32B 17/10027

USPC ............... 156/87, 99–109, 285, 286, 381
See application file for complete search history.

(56) References Cited

U.S. PATENT DOCUMENTS 3,659,896 A * 5/1972 Smith et al. .......... 296/93
4,310,600 A   1/1982 Cross
(Continued)

FOREIGN PATENT DOCUMENTS

EP    0539099    4/1993
JP    357047213 A    3/1982
(Continued)

OTHER PUBLICATIONS

U.S. Appl. No. 11/939,441, filed Nov. 13, 2007, McCormick et al.
(Continued)

*Primary Examiner* — Christopher Schatz
(74) *Attorney, Agent, or Firm* — Workman Nydegger (57) ABSTRACT

Protective laminate films protect an underlying windshield from damage due to impacting rocks and other debris. The protective laminate films generally include a flexible polymer substrate having a scratch resistant coating and an adhesive layer on opposing surfaces thereof. Each layer is transparent such that, when applied to a windshield, the laminate film does not inhibit visibility. Each layer may also be flexible so that the laminate films can be molded to a curved windshield. Generally, the scratch resistant coating protects the laminate films from scratching or other damage from impacting debris and/or from windshield wipers. The substrate provides structural integrity to the laminate films and may provide some degree of impact dispersion. The adhesive layer, in addition to adhering the laminate films to the windshield, may also provide significant impact resistance that helps protect the windshield from cracks or chips due to impacting rocks or other debris.

30 Claims, 1 Drawing Sheet

(51) Int. Cl.
*B32B 17/10* (2006.01)
*C09J 7/02* (2006.01)
*B32B 27/36* (2006.01)

(52) U.S. Cl.
CPC ............ *C09J7/0296* (2013.01); *C09J 2433/00* (2013.01); *C09J 2467/006* (2013.01); *B32B 27/365* (2013.01)

(56) References Cited

U.S. PATENT DOCUMENTS

| | | | |
|---|---|---|---|
| 4,477,519 A | 10/1984 | Frye | |
| 4,567,237 A | 1/1986 | Johnson et al. | |
| 4,751,139 A | 6/1988 | Hensel et al. | |
| 4,777,090 A | 10/1988 | Ovshinsky et al. | |
| 4,801,640 A | 1/1989 | Dallman et al. | |
| 5,002,326 A | 3/1991 | Westfield et al. | |
| 5,041,313 A * | 8/1991 | Patel | 427/379 |
| 5,132,588 A | 7/1992 | Warman | |
| 5,169,694 A | 12/1992 | Endo et al. | |
| 5,294,272 A * | 3/1994 | Peterson et al. | 156/85 |
| 5,346,569 A * | 9/1994 | Simon | 156/87 |
| 5,415,942 A | 5/1995 | Anderson | |
| RE35,318 E | 8/1996 | Warman | |
| 5,622,580 A * | 4/1997 | Mannheim | 156/106 |
| 5,653,497 A | 8/1997 | Campfield et al. | |
| 5,677,050 A | 10/1997 | Bilkadi et al. | |
| 5,730,644 A | 3/1998 | Pfanstiehl | |
| 5,763,089 A * | 6/1998 | Chaussade et al. | 428/425.3 |
| 5,820,201 A | 10/1998 | Jabalee | |
| 5,820,957 A | 10/1998 | Shroeder et al. | |
| 5,860,689 A | 1/1999 | Campfield et al. | |
| 5,871,843 A * | 2/1999 | Yoneda et al. | 428/337 |
| RE36,308 E | 9/1999 | Yang | |
| 5,972,453 A | 10/1999 | Akiwa et al. | |
| 6,030,671 A | 2/2000 | Yang et al. | |
| 6,082,535 A | 7/2000 | Mitchell | |
| 6,142,868 A | 11/2000 | Pfanstiehl | |
| 6,143,387 A | 11/2000 | Kubler et al. | |
| 6,227,599 B1 | 5/2001 | Campfield et al. | |
| 6,250,765 B1 | 6/2001 | Murakami | |
| 6,261,693 B1 * | 7/2001 | Veerasamy | 428/408 |
| 6,276,741 B1 | 8/2001 | Campfield et al. | |
| 6,372,313 B1 | 4/2002 | D'Alessio et al. | |
| 6,391,400 B1 | 5/2002 | Russell et al. | |
| 6,461,709 B1 | 10/2002 | Janssen et al. | |
| 6,482,488 B1 | 11/2002 | Janssen et al. | |
| 6,492,017 B1 | 12/2002 | Bohm et al. | |
| 6,613,411 B2 | 9/2003 | Kollaja et al. | |
| 6,614,423 B1 | 9/2003 | Wong | |
| 6,634,695 B2 | 10/2003 | Campfield et al. | |
| 6,660,388 B2 | 12/2003 | Liu et al. | |
| 6,660,397 B2 | 12/2003 | Fitch et al. | |
| 6,777,055 B2 | 8/2004 | Janssen et al. | |
| 6,802,416 B1 | 10/2004 | D'Alessio et al. | |
| 6,831,714 B2 | 12/2004 | Masaki et al. | |
| 6,841,190 B2 | 1/2005 | Liu et al. | |
| 6,878,425 B1 | 4/2005 | Gomes | |
| 6,960,040 B2 | 11/2005 | D'Alessio et al. | |
| 6,975,888 B2 | 12/2005 | Buesseler et al. | |
| 7,389,869 B2 | 6/2008 | Mason, Jr. | |
| 7,529,364 B2 | 5/2009 | Buehler | |
| 7,558,594 B2 | 7/2009 | Wilson | |
| 8,172,300 B2 | 5/2012 | McCormick et al. | |
| 2002/0127404 A1* | 9/2002 | Veerasamy | 428/408 |
| 2002/0176988 A1* | 11/2002 | Medwick et al. | 428/408 |
| 2003/0064198 A1* | 4/2003 | Thomsen et al. | 428/172 |
| 2003/0203167 A1* | 10/2003 | Bell et al. | 428/195.1 |
| 2004/0048023 A1 | 3/2004 | Clieve | |
| 2005/0022924 A1 | 2/2005 | Blackburn | |
| 2005/0047589 A1 | 3/2005 | Chang | |
| 2005/0116334 A1 | 6/2005 | Buehler | |
| 2006/0222801 A1 | 10/2006 | Mase | |
| 2007/0026234 A1 | 2/2007 | Mase | |
| 2007/0229962 A1 | 10/2007 | Mason | |
| 2008/0156414 A1 | 7/2008 | Campfield et al. | |
| 2009/0086415 A1 | 4/2009 | Chipping | |
| 2009/0301907 A1 | 12/2009 | Mason | |
| 2009/0325657 A1 | 12/2009 | Ramsdell et al. | |
| 2010/0270189 A1 | 10/2010 | Pedersen, II | |

FOREIGN PATENT DOCUMENTS

| | | |
|---|---|---|
| KR | 20-0206982 | 12/2000 |
| WO | WO03-036454 | 5/2003 |
| WO | WO2007-046637 | 4/2007 |

OTHER PUBLICATIONS

Office Action dated Jan. 15, 2010 from U.S. Appl. No. 11/939,441.
Office Action dated Jun. 7, 2010 from U.S. Appl. No. 11/939,441.
3M Introduces Anti-Graffitti Solution for Commercial Buildings, 3M United States, Jul. 29, 2002, 2 pages.
3M Optically Clear Laminating Adhesives, 3M United States, Jul. 2001, 6 pages.
3M Optically Clear Adhesives, 3M United States, 2002, 2 pages.
3M™ Optically Clear Adhesive 8141 Clear 24 in. × 180 ft., 1 per case, 3M United States, Nov. 18, 2003, 2 pages.
3M™ Optically Clear Laminating Adhesives, 3M United States, Nov. 18, 2003, 2 pages.
Scotchgard™ Anti-Graffitti Window Film AG-4 60 ft. × 150 ft., 3M United States, Nov. 18, 2003, 5 pages.
Scotchgard™ Anti-Graffitti Window Film AG-7, 60 ft. × 100 ft., Nov. 18, 2003, 2 pages.
Protection Against Shattering Experiences, DuPont™ Spallshield®, Nov. 17, 2003, 6 pages.
Ricochet Protects, www.richochet.com, Mar. 17, 2004, 4 pages.
Supertint Sun Control Specialists, www. supertint.com, Feb. 2, 2004, 11 pages.
Llumar Window Film, www.llumar.com, Feb. 2, 2004, 5 pages.
How NASCAR Safety Works, www.auto.howstuffworks.com, Mar. 15, 2004, 5 pages.
Office Action dated Aug. 30, 2006 cited in related U.S. Appl. No. 10/993,619.
Office Action dated Mar. 8, 2007 cited in related U.S. Appl. No. 10/993,619.
Office Action dated Aug. 15, 2007 cited in related U.S. Appl. No. 10/993,619.
Office Action dated Feb. 5, 2008 cited in related U.S. Appl. No. 10/993,619.
Tocken Wrapper, Protective film for ipod shuffle; www.tocken.co.kr; 2004-2005.
Tocken Wrapper for iPod mini; http://caizer.com/?mid=tech&page=22&document_srl=20234&listStyle=&page=; Feb. 18, 2005.
http://www.enfun.net/technique/review/?step=20&dataSeqNo=42417; Jan. 13, 2005.
Statement of Min-Woo Seo; Mar. 10, 2010.
http://www.appleforum.com; AppleForum; Jul.-Nov. 2005.
WITHIPOD Community for Korean Ipod Users; http://withipod.net/?mid=podmagazine_notice&category=2078464&search_keyword=tocken&search_target=title&document_srl=2078532; Nov. 22, 2004.
Tocken Wrapper, User's Review; www.withipod.net; Mar. 24, 2005.
Tocken Wrapper, User's Review; www.withipod.net; Mar. 21, 2005.
Tocken Wrapper, Magazine Article, MacMadang, p. 48, Published Jul. 1, 2005.
User's review of Noxk PSP protection film from internet website; http://raven.egloos.com/1076693; Jul. 25, 2005.
Sales Bulletin for Tocken Wrapper; http://kmug.co.kr, Sep. 11, 2005.
Crandall/Dahl/Lardner; "An Introduction to the Mechanics of Solids", pp. 273-276; Jan. 25, 1996. See pp. 14-15 of NPL document No. 13 for relevance.
Presentation for Oral Hearing for Invalidation and Scope Confirmation Trial of Registered Patent No. 784501 (Case No. 2008 Dang 3751 and 2009 Dang 1523); Kim & Chang, Mar. 16, 2010.

(56) References Cited

OTHER PUBLICATIONS

English Translation of Sep. 18, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

Oct. 14, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

Oct. 14, 2009 Brief for SGP, Invalidation and Scope Confirmation Trial of Registered Patent No. 784501 (Case No. 2008 Dang 3751 and 2009 Dang 1523).

Nov. 14, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

U.S. Appl. No. 11/681,665, Feb. 2, 2010, Office Action.
Office Action dated Nov. 10, 2010 from U.S. Appl. No. 11/939,441.
U.S. Appl. No. 11/939,441, Apr. 6, 2011, Notice of Allowance.
U.S. Appl. No. 11/939,441, Jun. 7, 2011, Notice of Allowance.
U.S. Appl. No. 13/167,412, Dec. 27, 2011, Notice of Allowance.
U.S. Appl. No. 13/167,412, Mar. 7, 2012, Notice of Allowance.
U.S. Appl. No. 10/993,619, filed Nov. 19, 2004, McCormick.
U.S. Appl. No. 14/330,269, filed Jul. 14, 2014, McCormick.

* cited by examiner

METHOD OF MANUFACTURING A WINDSHIELD HAVING A PROTECTIVE LAMINATE

CROSS-REFERENCE TO RELATED APPLICATIONS

This application is a division of copending U.S. patent application Ser. No. 10/993,619, filed Nov. 19, 2004, which claims the benefit of U.S. Provisional Patent Application No. 60/523,966, filed Nov. 21, 2003, and U.S. Provisional Patent Application No. 60/552,784, filed Mar. 12, 2004, the disclosures of which are incorporated herein in their entirety.

BACKGROUND OF THE INVENTION

1. The Field of the Invention

The present application relates to the field of protective coatings and laminates. More particularly, the present invention relates to a method of applying a durable optically transparent laminate to a windshield for protecting the windshield from damage due to gravel, rocks or other debris impacting the windshield, as well as protected windshields made thereby.

2. The Relevant Technology

Every year, millions of windshields are damaged by rocks or other debris that impact the windshield. Winter is particularly hazardous in many areas where environmental constraints on the use of salt to control icy surfaces result in a great deal of sand or other biodegradable substances being used. This sand, coupled with rocky areas as well as natural rubble and construction debris, has created a year-round hazardous situation for glass (and/or laminated) windshields in any overland vehicle or glass in other equipment, as the sand and other rubble are thrown up and collided with windshields.

If the damage is small, such as a small chip in the windshield, it can often be repaired in situ. Large damage such as larger chips and cracks, however, requires the windshield to be replaced. The cost of repairing or replacing each windshield ranges up to hundreds of dollars or more. Accordingly, there is a continuing need for methods to reduce windshield replacements by reducing windshield damage from impacting debris.

Previous attempts to provide exterior films to protect windshields from damage have failed or are limited for any of a number of reasons. Such reasons include, for example, that the films: do not cover the entire glass; do not adhere to the glass; do not conform to a curved windshield; are not UV stable over the long term; the materials readily scratch from windshield wipers and car wash brushes; and/or have poor optical quality due to inferior film or adhesive restrictions.

For example, U.S. Pat. No. 6,634,695 ("the '965 patent") discloses an impact resistant barrier around the periphery of a windshield. Generally disclosed barrier materials in the '965 patent include clear polymeric films as well as opaque materials such as rubber, plastic, or metal. Particularly, one suitable barrier material disclosed by the '965 patent is Scotchcal™, an 8 mils urethane film sold by 3M. By limiting the extent of these clear and opaque barriers to the periphery, high visibility is maintained in the center of the windshield while protection is provided around the periphery. This approach is clearly limited in that the barriers are not suitable to cover the entire windshield. Thus, in order to maintain a suitable visibility where the barrier materials are applied, the '965 patent limits itself to protecting only those portions of the windshield where high visibility is not necessary.

Attempts thus far at providing a clear protective film to cover an entire automobile windshield have failed for various reasons, typically because the suggested films are not sufficiently transparent, distort the view, are not UV stable, or scratch easily. For example, the transparent laminate materials currently commercially available as Scotchgard Anti-Graffiti Window Film AG-4 and Scotchgard Anti-Graffiti Window Film AG-7 from 3M Corporation were tested for windshield applications. These films were found to be unsuitable because they do not provide sufficient scratch resistance for windshield applications and the underlying PET is not UV stable. Under the demanding conditions a windshield places upon a laminate film, the AG-4 and AG-7 were both been found to degrade and scratch more than is acceptable.

Accordingly, there is a continuing need for new and improved methods and devices to protect entire windshields from damage without significantly reducing the optical qualities of the windshield.

BRIEF SUMMARY OF THE INVENTION

The present application provides protective coatings and laminates for vehicle and equipment windshields. The protective coatings and laminates are optically transparent and thin yet still protect an automobile windshield from damage due to object impacts or scratching. The various layers of the protective laminate films serve one or more of several principal functions, including: scratch resistance, structural support for the laminate film, shock absorbance, and adhesion to an underlying glass surface. These functions are obtained while maintaining high clarity and being substantially distortion free.

Accordingly, a first example embodiment of the invention is an optically transparent laminate film for protecting a vehicle windshield. The film generally includes: a substrate comprising a first surface and a second surface; a scratch-resistant coating disposed upon the first surface of the substrate; and an adhesive layer disposed upon the second surface of the substrate.

Another example embodiment of the invention is an optically transparent laminate film for protecting a vehicle windshield. This film generally includes: a scratch-resistant substrate comprising a first surface and a second surface, the first surface comprising a material that is substantially scratch resistant; and a shock absorbing adhesive layer disposed upon a second surface of the substrate, wherein the shock absorbing adhesive layer is effective to: substantially disperse the impact forces of debris that contacts an automobile windshield and thereby reduce damage to the windshield; and securely adhere the laminate film to the underlying automobile windshield.

Yet another example embodiment of the invention is an optically transparent laminate film for protecting a standard overland laminated safety glass automobile windshield. The film generally includes: a transparent substrate comprising a first surface and a second surface, the substrate having a thickness of from about 3 mils to about 5 mils; a scratch-resistant coating disposed upon a first surface of the substrate, wherein the scratch resistant coating has a thickness from about 2 microns to about 10 microns; and an adhesive layer disposed upon a second surface of the substrate, wherein the adhesive layer has a thickness from about 14 GSM to about 20 GSM and wherein the adhesive layer is shock absorbing such that it substantially disperses forces from impacting debris and thereby reduces damage to an underlying glass layer.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to protective laminate films for automobile windshields. When properly applied to the exterior of a glass windshield, the protective laminate films can extend the life of a windshield by reducing or eliminating windshield damage caused by flying rocks or other debris. The various layers of the protective laminate films serve one or more of several principal functions, including: scratch resistance, structural support for the laminate film, shock absorbance, and adhesion to an underlying glass surface. In addition, the protective laminate films maintain an optically clear and substantially distortion-free view for a driver and avoid scratches or other marring that conventional attempts to protect a windshield are subject to. At the end of the laminate film's service life or when it is damaged, preferred laminate films of the invention can be removed by a user without great difficulty, returning the windshield to its original state.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. In particular, the various layers of the protective laminate films are drawn without regard for any particular layer thicknesses. No inference should therefore be drawn from the drawings as to the layer thicknesses.

In the following description, numerous specific details are set forth in order to provide a thorough understanding of the present invention. It will be obvious, however, to one skilled in the art that the present invention may be practiced without these specific details. In other instances, well-known aspects of laminate films have not been described in particular detail in order to avoid unnecessarily obscuring the present invention.

All measurements disclosed herein are at sea level at standard temperature and pressure, unless indicated otherwise.

Figure 1:
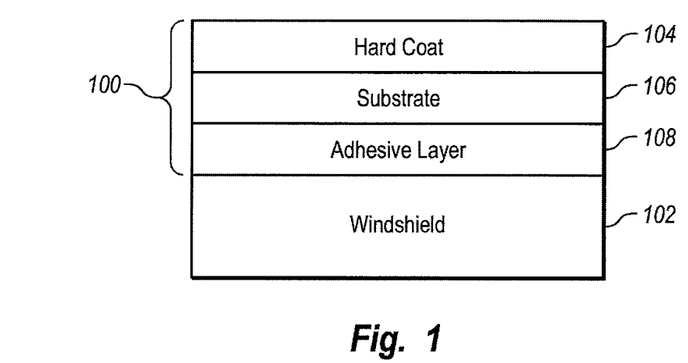
FIG. 1 illustrates a protective laminate film according to one embodiment of the invention.

FIG. 1 depicts a preferred example of a protective laminate film 100 adhered to windshield 102 according to the invention. In this embodiment of the invention, protective laminate film 100 includes a substrate 106 with a scratch resistant coating 104 on an exterior surface thereof and an adhesive layer 108 on a windshield adjacent surface thereof.

Figure 2:
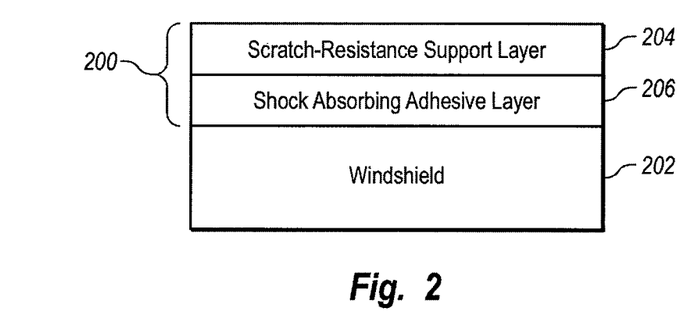
FIG. 2 illustrates a protective laminate film according to another embodiment of the invention.

Although the layered structure depicted in FIG. 1 is the presently preferred structure, other possible layered structures may also be used depending upon the details of the windshield the laminate film is designed for as well as the intended use. In addition, materials developed in the future may alter the preferred construction of the laminated films disclosed herein. For example, FIG. 2 depicts laminate film 200 adhered to windshield 202. Laminate film 200 includes a scratch-resistant substrate 204 and a shock absorbing adhesive layer 206.

Other non-limiting examples of different layered structures include: scratch resistant coating/substrate/shock absorbing adhesive layer/shock absorbing substrate/adhesive; scratch resistant coating/shock absorbing layer/substrate/adhesive; and other similar structures. In each of the foregoing, one or more of the substrate(s) and the adhesive(s) can be shock absorbing. The particular selection of layer selection and thicknesses may depend on the angle at which a windshield is inclined, such as 90° in the case of security vehicles all the way down to about 27° for some sport vehicles.

As previously mentioned, there are several functions that laminate film 100 performs. These include at least scratch resistance, structural integrity, shock absorbance, impact dispersion, and windshield adhesion. In order to meet the foregoing requirements, one or both of the substrate 106 and the adhesive layer 108 can be selected to provide shock absorbance.

In addition to satisfying the foregoing design limitations, each layer in the laminate film provides UV protection, for example of greater than 99%. Various embodiments will also preferably repel water and/or dampen sound as well as have the ability for quick and easy removal from a windshield.

The protective laminate films of the invention (and thus each of the layers discussed herein) must be optically clear and substantially distortion free. They should preferably satisfy certain minimum requirements as to flexibility (suitable for application to a curved windshield and/or storage on a roll), extensibility (from 100 to 600% elongation at break), haze (less than 1%), consistent refractive index over the entire laminate film, high transmittance (over 97%) over the visible wavelength range (approximately 400-700 nm), chemical, water, and temperature resistance, and general durability (at least 1 year under normal wear, preferably at least 3 years, more preferably at least 5 years). In effect, the laminate films of the invention are preferably virtually unnoticeable to a user looking through a windshield 102 over which a protective laminate film 100 is applied. In addition, a windshield supporting the laminate film must continue to satisfy all applicable government standards, including for example the Department of Transportation's Head Impact Crash Tests.

Referring again to FIG. 1, scratch resistant coating 104 is employed to prevent scratches or markings on the windshield from windshield wipers, car wash brushes, small debris that impacts the windshield, and the like. Normally a glass windshield is substantially resistant to such scratching or marring and no scratch resistant coating is needed. The application of the protective laminate film, however, creates the need for a scratch resistant coating due to the tendency of most transparent materials that can be used in a protective laminate film to scratch or retain other undesirable markings. If the laminate film is to be used in an area requiring significantly heavier wiper usage, such as certain areas of the Pacific Northwest, more durable scratch resistant coatings may be required.

Accordingly, scratch resistant coating 104 can be any transparent material suitable for preventing scratching and marring while meeting the other design requirements for the laminate film. Scratch resistant coatings are generally known in the art, although not all are suitable for use on automobile windshields. For example, the scratch resistant coating marketed as Madico CL-400 is suitable for use in short term applications in the protective laminate films of the invention. Longer lasting scratch resistant coatings are characterized by having only a 2% or less increase in haze after receiving 100 strokes from a Tabor wheel (the Tabor wheel is a device for testing hardness that is known in the art). In addition, preferred scratch resistant coatings allow focused light (such as headlights) to pass through without scattering. This feature is obtained in sufficiently hard scratch coatings by reducing the number of light scattering particulates, such as silicates or other contaminants, that are typically present in scratch resistant coatings. In addition, long lasting scratch resistant coatings are preferably UV stabilized by methods known in the art to prevent them from deteriorating due to UV light. A long lasting scratch resistant coating as described above is currently available from Madico Inc. in Woburn, Mass.

The scratch resistant coatings as used in embodiments of the invention preferably have a thickness of from about 2 microns to about 10 microns, more preferably from about 3 microns to about 5 microns.

Substrate 106, in turn, must be flexible such that it can conform to a curved glass surface while being sufficiently rigid and durable to hold the protective laminate film together in adverse conditions or over time. In addition, the substrate 106 will disperse the impact forces of an impacting rock or other debris. Preferred substrates will also be UV stabilized so they do not degrade over the usable life of the laminate film. Examples of suitable substrates may include: plasticized vinyl (polyvinyl chloride with plasticizer) or other optically transparent materials such as polyethylene terephthalate (PET), PET/polycarbonate blend, polyester, polyurethane, urethane, polycarbonate, acrylic based materials, and blends and combinations of the foregoing may be used as the substrate. Manufacturers of the foregoing include, for example, General Electric Polymers, DuPont, 3M, Avery Dennison, Bekaert Film, CP Films, Hanita Films, Rohm Haas, Madico, Hisco, Johnson Laminating, Kimoto Tech, Strata Film Coatings and InteliCoat.

In one embodiment, the substrate and scratch resistant coating can include an optical grade, TV stable polyester layer with a scratch-resistant and mar-resistant UV stable coating (made of Tinuvin®-enriched acrylic acrylate scratch resistant coating, for example) on the outer surface.

In another preferred embodiment of the invention a combined scratch resistant substrate can be obtained and used. Such a scratch resistant substrate may be a monolithic material or may comprise a laminate with various layers.

The substrate preferably has a thickness of from about 2 mils to about 10 mils, more preferably from about 3 mils to about 8 mils, still more preferably from about 3 mils to about 5 mils.

The optical grade adhesive layer 108 is used to adhere the laminate film to the windshield. Preferred adhesives are, by way of example only, optically clear, pressure sensitive, solvent based, acrylic adhesives. Other suitable adhesives may include solvent based adhesives, hot melt adhesives, water based adhesives, and alcohol-based adhesives. Manufacturers of such adhesives include, by way of example only, corporations such as Ashland Chemical, Adhesive Research, Rohm Haas, National Starch, Solutia, Sovereign, and Avery Dennison.

Several example optical grade adhesives that are currently commercially available from the 3M Corporation include: 3M 1 mil permanent and Optically Clear Laminating Adhesives 8141, 8142, 8161, and 9483. Other preferred adhesives include Intelicoat 0.00325, Intelicoat 0.003 OCAV3, and Intelicoat 0.003 OCALT, Madico "X" and "G" adhesives, Kimoto Tech adhesives, and optical grade adhesives from Lintech. Of course, any of numerous other optical grade adhesives may be suitable so long as they meet the aforementioned design criteria for the laminate film. In addition, suitable optical grade adhesives are non-crystalline. For example, a number of polyurethane and acrylic based optical grade adhesives are known in the art.

In addition, either or both of the adhesive layer 108 and substrate 106 can provided the requisite shock absorbing functions. Thus, preferred adhesive materials will be selected to optimize shock absorbing functionality. The shock absorbing layer(s) and the impact dispersing effect of the substrate are implemented to substantially absorb and disperse the impact forces of rocks and other debris that impact a windshield. As a result, a rock thrown up by a large truck may deflect off the windshield with only a minor mark caused its impact. In contrast, without the shock absorbing layer a large break or crack in the windshield would likely occur.

Various features of proposed shock absorbing materials must be considered before selecting a suitable shock absorbing layer. In addition to the foregoing mentioned characteristics of suitable laminate films, such as flexibility, high optical transmittance, low distortion, and durability, the shock absorbing layer also needs to have a suitable degree of hardness to absorb and substantially disperse the impact of the debris without breaking or allowing the windshield to break. Accordingly, the shock absorbing layer preferably has a Shore A hardness from about 0 to about 80, more preferably from about 0 to about 20, still more preferably from about 10 to about 20.

In one presently preferred embodiment of the invention a shock absorbing adhesive layer can be used. Such a material may be a single layer of an optical grade adhesive or a relatively thick layer of two or more optical grade adhesives. For example, two 5 mil layers of laminar optical adhesive can be placed back to back to provide a single 10 mil shock absorbing adhesive layer with excellent shock absorbing, adhesive, and optical properties. Suitable optical grade adhesives include materials disclosed herein or otherwise known in the art. For example, the Optically Clear Laminating Adhesives 8141, 8142, 8161, and 9483 from the 3M Corporation may be suitable for use as a shock absorbing layer in some embodiments of the invention when applied in a sufficient thickness.

In one embodiment of the invention, the optical adhesive intended for use as a shock absorbing adhesive layer is obtained in mass form and applied to the aforementioned substrate to a desired thickness. Notably, such use may include applying the adhesive much thicker than is contemplated when it is used solely for its adhesive properties.

Depending upon the selected material and the associated hardness, the adhesive layer preferably has a thickness of from about 1 mil to about 50 mils, more preferably from about 5 mils to about 40 mils, still more preferably from about 5 mils to about 15 mils. Alternatively, the adhesive layer can be characterized by GSM (grams per squared meter). Thus, the preferred adhesive can have a thickness of from about 12 to about 30 GSM, more preferably from about 14 to about 20 GSM. Although it is possible to use more adhesive than 20 GSM to obtain a higher level of impact protection, the higher levels of adhesive provide a greater chance of increased optical distortion in applications where the rake of the windshield is closer to the horizontal plain.

As previously noted, the particular selection of layer materials and thicknesses may depend on the angle at which a windshield is inclined, such as 90° in the case of security vehicles all the way down to about 27° for some sport vehicles. For a 27° windshield, one preferred laminate film will have 17 GSM adhesive under a 4 mil substrate layer with a suitable scratch resistant coating. These layers are relatively thin because the angle at which a user looks through the windshield increases the amount of a laminate film they look through. A 90° windshield, in turn, may have up to 7 mils of PET and 7 mils of adhesive, with a scratch resistant coating, and still maintain suitable clarity.

Figure 3:
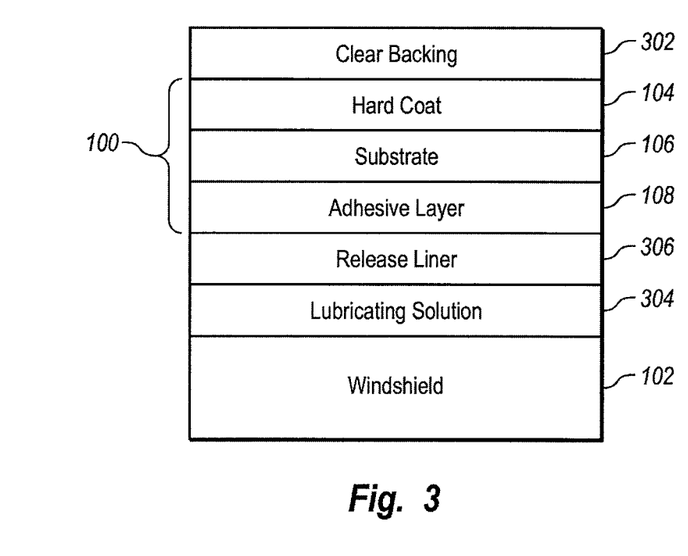
FIG. 3 illustrates one step in the process of applying a protective laminate film to a windshield according to another embodiment of the invention.

Referring now to FIG. 3, according to one embodiment of the invention, a protective laminate film 100 may be packaged to have a release liner 306 on the glass adjacent surface and a clear backing 302 on the opposing surface of the laminate film 100. The clear backing and release liner allow the laminate film 100 to be handled, stored, transported, and installed without wear on the upper and lower surfaces of the protective film. Alternatively, liners or backing formed of a non-clear material may be substituted for the clear backing and/or the release liner, although in some cases this diminishes the optical clarity of an installed film. Also depicted in FIG. 3 is lubricating solution 304, which is used in one step of the installation procedures as described further below.

There are various methods of installing thin films to glass surfaces. For example, it is well known that there are a variety of methods for installing tinting to automobile windows, including for example only: wet-lamination, dry-lamination, the use of steam or water as a lubricating solution, and the use of a hard or soft squeegee. Accordingly, the following description of one preferred method of installing a laminate film is not limiting of the ways in which the laminate films of the invention can be installed. Rather, it will be understood by those skilled in the art that there are numerous methods of installing films to glass surfaces and that some of these may also be employed to install the inventive laminate films described herein. In particular, suitable installation methods require careful handling of the film to maintain a surface free of optical defects.

In the described embodiment of the invention, the following tools are recommended for installation: stainless steel knife; 32 oz water bottle (for slip agent); soap for cleansing agent; gallon of distilled water; 6" soft cleaning squeegee; 4" hard Teflon squeegee; and heat gun.

The film can be applied to an unmounted windshield or a mounted windshield (mounted in a vehicle). Although not required, indoor installations are preferred. The indoor installation provides a more controlled environment which reduces the chance of dirt or debris getting trapped between the windshield and the laminate film. In the case of outdoor installations, the amount of time that the adhesive is exposed before it is applied should be as short as possible.

Initially, the condition of a windshield is important to a successful laminate film installation. This is because a laminate film bonds best with a new windshield that is both clean and unmarred. A cracked or pitted windshield will tend to trap additional moisture during the installation resulting in an installation that may not look as good as a new windshield having the laminate film applied. Nevertheless, a laminate film can be applied to a cracked or pitted windshield if desired. Of course, a clean windshield is also important in achieving an optically clear installation. This is because any foreign materials that remain between the glass and the laminate film during installation will remain for the life of the protective film.

Accordingly, a first installation step is selecting the correct laminate film for the vehicle to be protected. As previously noted, the precise configuration of a laminate film, including for example layer thicknesses and layer materials, may vary based on the angle of inclination of the windshield and the automobiles expected use. It is important for optimum performance, therefore, to verify that a correctly selected film is used for installation.

Next, as previously noted, the windshield must be cleaned and inspected. This may involve first spraying the windshield with a warm water/soap solution or other approved lubricant. Preferably the lubricants will not contain any additional chemicals that could cloud over time or react with the adhesive. In some cases, simple water may be the most effective lubricant. A window razor is then used to remove any dirt, bugs or debris by scraping the wet, lubricated windshield. Care must be used to not scratch the windshield during the cleaning process as a window cleaning razor can easily scratch glass. The lubricating solution such as water helps ensure that the windshield is not scratched by the razor. A squeegee and damp paper towel can then be used to remove any debris and lubricating solution. This process can be repeated, using the lubricating solution and razor to remove any remaining debris on the windshield. After the debris and lubricating solution are again removed, the windshield should be clean and ready to accept the laminate film.

The laminate film is preferably pre-cut to the correct size, but may also be trimmed during installation to fit the windshield. In either case, it is fit preferably to within ¼" to ¹⁄₁₆" from the edge molding on each side of the windshield glass. If the laminate film must be trimmed during installation, a stainless steel knife blade is preferred as steel blades will scratch the glass. The trimmed laminate film must be checked for wrinkles or folds to determine the amount of hand forming required to conform the film to the glass.

For non pre-formed installations or where the laminate film is not fitting perfectly, a heat gun and hard squeegee can be used to remove any folds and wrinkles. There are two common methods derived in the window tint industry for shaping film to a contoured surface for this purpose. These are commonly referred to as "dry shrinking" or "wet shrinking." Either method is acceptable. The wet method involves first wetting a windshield with a lubricating solution such as water. The laminate film is placed on the windshield in the proper orientation (as though it was actually installed with the release liner against the window and the scratch resistant coating facing out). A squeegee is used to gently remove the lubricating solution from the center of the film. Ridges where the film is to be shrunk are formed by the squeegee action, preferably towards the periphery of the windshield since the laminate film will shrink more along the top and bottom of the windshield.

The heat gun is next used to carefully apply heat to warm the laminate film and start the shrinking process. A squeegee can be used to carefully conform the laminate film to the windshield to avoid any wrinkles. Additional water may be used as needed behind the film. When finished, the laminate film should lie on the windshield without any large wrinkles or folds. Slight wrinkles can be removed during the final installation step further below. At this point, it is important to note that the laminate film has not yet been affixed to the windshield.

The "dry method" is essentially the same as the "wet method" previously described, with one notable change. A dryer sheet or a wool glove is rubbed onto the glass to setup a static charge to hold the film in place during the shrinking process.

The laminate film is then removed from the windshield for a final cleaning. One preferred method for a final cleaning is to spray the windshield with water using a spray bottle. A squeegee is again used to remove the water and any dust or particles. The windshield is now ready for the laminate film to be applied.

Starting at one corner, with the help of a piece of tape if necessary, the release liner is partially removed from the laminate film while spraying the adhesive with the slip agent. The release liner is then allowed back to the original position. This process is repeated on the remaining portion of the laminate film such that the release liner is loosened from the laminate film for the actual application. The film is then rolled across the windshield into a roll of approximately 2" diameter. This is commonly referred to as the "reverse roll" installation method. The installer should be careful not to allow anything to come in contact with the adhesive. If lint or other small objects do come in contact, however, it may be possible to wash the lint off using the slip agent.

In one embodiment, the laminate film has a release liner or clear backing on each surface thereof. Accordingly, it may be preferred that only the lower release liner is removed at this time but the upper clear backing remains in place during installation so that the upper surface of the laminate film can be more easily handled during application of the laminate film.

The slip agent is critical for a successful installation. The slip agent can be various solutions, for distilled water or water and a small amount of clean soap such as crystal light. Alcohol and other spirit based products should not be used as they may react with the adhesive. The slip agent is preferably applied to the windshield so that the applied protective laminate film can be adjusted into position on the windshield before the slip agent dries and the adhesive layer securely adheres to the windshield. Too much slip agent is not possible while too little will cause a difficult or failed installation. The slip agent is preferably used by coating the windshield and the adhesive side of the laminate film with a generous coating of slip agent. With the wet windshield and the wet film, the next step is to position the laminate film onto the windshield using the reverse roll method.

After the laminate film is positioned on the windshield, a Teflon squeegee may be used to remove the slip agent and trapped air that is between the laminate film and the windshield. A generous amount of slip agent is placed on the exterior surface of the laminate film to facilitate and lubricate this squeegee process. In addition, the squeegee can be covered with a soft cloth that is damp with slip agent to reduce the chance of scratching the exterior surface of the laminate film.

Next, starting in the top and center of the windshield, a vertical line is drawn in the downward direction with the squeegee to hold the laminate film in place. Additional strokes are performed, working from the center to each side of the windshield. It is also preferred to adjust the cloth on the squeegee to a new clean position for each stroke. This is to remove any debris from the windshield from that may be flushed out from under the trim and caught in the squeegee towel. It is also important to add additional slip agent on the outside of the laminate film as needed to act as a lubricant until the squeegee process is completed. This helps reduce the possibility of scratches from the squeegee.

The process of using the squeegee, top to bottom, working from the inside out, is continued to push the water out to the edges until all the air bubbles and slip agent is removed. It is desirable to remove as much of the slip agent as possible before the adhesive becomes fully tacked to the windshield. If a small amount of moisture becomes trapped, it will evaporate through the laminate film over the next few days or week depending on the ambient temperature.

Finally, a stainless steel window knife is preferably used to trim the excess laminate film to within ⅛" of the windshield trim.

The installation is then ready for inspection. A cloth and window cleaner can be used to remove any dirt or finger prints from the film. In particular, the edges must be inspected to ensure a proper bond. If any moisture pockets are found near the edges, the Teflon squeegee can be used to push them out. When properly installed, a windshield laminate will not suffer from any air bubbles. The foregoing method of installation will not result in any areas of significant distortion other than distortion from any small moisture pockets that were left between the film and the windshield. As the small moisture pockets evaporate the distortion will disappear.

Full adhesion typically will not occur for 72 hours or longer depending on outside temperatures. For preferred embodiments of the invention, however, the laminate film adhesive should reach a level of adhesion sufficient to handle freeway speeds and automatic car washes within one hour of the installation.

In one embodiment, the laminate film's edge is bonded to the windshield glass with, for example, a black silicone rubber sealant. The edge sealer is preferably covered by a temporary protective tape to protect the silicone bead from the weather, until it is dry.

Optionally, the laminate film can be additionally coated with a silicone oil coating to protect the film even further from bird dung, hand prints, etc. This silicone oil coating can be, for example, 10 to 50 centistoke silicone oil commercially available from The Dow Corning Corporation of America. The silicone oil coating is applied by spraying or hand wiping.

The laminate films of the invention can be manufactured by any of the various calendaring methods and devices known in the art for forming laminate films, including for example heat laminating and cold wet laminating. In one embodiment of the invention, the manufactured films can be cut to size and thermoformed to a windshield mold, thereby pre-forming the laminate film to a shape that matches that of a curved windshield. This method can reduce distortion, if any, that a laminate film might otherwise cause on a curved windshield.

The protective laminate films can be left applied to a windshield for as long as desired, from a matter of days up to several years or more. For example, an automobile rental company may affix a protective laminate film to a rental car's windshields. After the end of the rental car's period of use as a rental, the protective laminate film can be removed prior to sale. Such a usage can significantly reduce the cost to rental car companies in replacing or repairing automobile windshields prior to sale of their used car fleets. Similarly, an automobile lessee may desire to apply the film to their leased vehicle for the term of their lease, thus reducing the chances of having to absorb the cost of a damaged windshield at the end of a lease period.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of applying a protective laminate film to an exterior surface of a vehicle windshield to provide shock absorbing properties, maintain optical clarity, and protect the exterior surface of the vehicle windshield from cracks or chips when impacted by gravel, rocks or other debris, comprising:
- (a) providing or obtaining a protective laminate film comprised of:
  - a flexible single layer polymer substrate having a first surface and a second surface;
  - a scratch-resistant coating adhered to the first surface of the single layer polymer substrate;
  - a pressure sensitive adhesive layer adhered to the second surface of the single layer polymer substrate and configured to maintain optical clarity and disperse forces from gravel, rocks or other debris impacting the windshield during use; and
  - a release liner adjacent to the pressure sensitive adhesive layer that protects the pressure sensitive adhesive layer prior to application of the laminate film to the windshield,
  - the laminate film being flexible so as to readily conform to a curvature of a vehicle windshield and/or be wound and stored as a roll while remaining substantially optically transparent;
- (b) removing the release liner from the protective laminate film;
- (c) positioning the protective laminate film over the exterior surface of the vehicle windshield; and
- (d) causing or allowing the pressure sensitive adhesive layer to adhere to the exterior surface of the vehicle windshield.

2. A method as defined in claim 1, wherein the vehicle windshield is curved so that the exterior surface is convex and an interior surface is concave, the protective laminate film being applied to the convex exterior surface of the vehicle windshield.

3. A method as defined in claim 1, further comprising applying an aqueous liquid to the exterior surface of the vehicle windshield prior to (b)-(d).

4. A method as defined in claim 3, further comprising removing at least a portion of the aqueous liquid from the exterior surface of the vehicle windshield prior to (b)-(d) so as to remove debris from the exterior surface.

5. A method as defined in claim 3, further comprising moistening the adhesive layer of the protective laminate film with the aqueous liquid and placing the moistened adhesive layer onto the exterior surface of the vehicle windshield.

6. A method as defined in claim 5, further comprising applying pressure to the protective laminate film to remove air bubbles and/or liquid from between the protective laminate film and the exterior surface of the vehicle windshield.

7. A method as defined in claim 5, further comprising causing or allowing the aqueous liquid to dry in order for the adhesive layer to adhere to the exterior surface of the vehicle windshield.

8. A method as defined in claim 1, further comprising trimming the protective laminate film so as to fit within ¼ inch to 1/16 inch from the edge molding of the vehicle windshield when installed on a vehicle.

9. A method as defined in claim 1, further comprising heating the protective laminate film.

10. A method as defined in claim 9, wherein heating the protective laminate film causes it to shrink so as to better conform to a shape of the exterior surface of the vehicle windshield.

11. A method as defined in claim 1, wherein (b) and (c) are performed by a reverse roll method.

12. A method as defined in claim 1, wherein the flexible single layer polymer substrate comprises polyethylene terephthalate.

13. A method as defined in claim 1, wherein the flexible single layer polymer substrate comprises a material selected from the group consisting of plasticized vinyls (polyvinyl chloride with plasticizer), polyesters, polyurethanes, polycarbonates, and acrylics, and has a thickness of from about 2 mils to about 10 mils.

14. A method as defined in claim 1, wherein the adhesive layer has a Shore A hardness of from about 10 to about 20, is selected from the group consisting of acrylic, urethane, polyvinyl alcohol, and polyvinyl chloride based materials, and comprises two or more laminar optical grade adhesives laminated together to form a compound layer having more shock absorbance properties than the laminar optical grade adhesives have singularly.

15. A laminate film as defined in claim 1, wherein the scratch-resistant coating has a thickness from about 2 microns to about 10 microns.

16. A method of applying a protective laminate film to an exterior surface of a vehicle windshield attached to a vehicle to provide shock absorbing properties and protect the exterior surface of the vehicle windshield from rocks or other debris, comprising:
- (a) providing or obtaining a protective laminate film comprised of:
  - a flexible single layer polymer substrate having a first surface and a second surface;
  - a UV-stabilized scratch-resistant material forming or adhered to the first surface of the single layer polymer substrate;
  - a pressure sensitive adhesive layer adhered to the second surface of the single layer polymer substrate; and
  - a release liner adjacent to the adhesive layer that protects the adhesive layer prior to application of the laminate film to a windshield,
  - the laminate film being flexible so as to readily conform to a curvature of a vehicle windshield and/or be wound and stored as a roll while remaining substantially optically transparent;
- (b) removing the release liner from the protective laminate film;
- (c) placing the protective laminate film over the exterior surface of the vehicle windshield on the outside of the vehicle; and
- (d) causing or allowing the adhesive layer to adhere to the exterior surface of the vehicle windshield.

17. A method of applying a protective laminate film to an exterior surface of a window to protect the window from scratching or optical damage, comprising:
- (a) providing or obtaining a protective laminate film comprised of:
  - a flexible single layer polymer substrate having a first surface and a second surface;
  - a scratch-resistant material forming or adhered to the first surface of the single layer polymer substrate;
  - an optical grade pressure sensitive adhesive layer adhered to the second surface of the single layer polymer substrate; and
  - a release liner adjacent to the pressure sensitive adhesive layer that protects the pressure sensitive adhesive layer prior to application of the laminate film to the exterior surface of the window,
  - the laminate film being flexible so as to remain substantially optically transparent if curved or bent prior to or during installation, the flexible single layer polymer substrate, scratch-resistant material, and pressure sensitive adhesive layer together having optical transparence and providing light transmittance across the visible spectrum greater than 97%;
(b) removing the release liner from the protective laminate film;
(c) placing the protective laminate film over the exterior surface of the window; and
(d) causing or allowing the pressure sensitive adhesive layer to adhere to the exterior surface of the window.

18. A method as defined in claim 17, further comprising moistening the pressure sensitive adhesive layer of the protective laminate film with an aqueous liquid and placing the moistened pressure sensitive adhesive layer onto the exterior surface of the window.

19. A method as defined in claim 18, further comprising applying pressure to the protective laminate film to remove air bubbles and/or liquid from between the protective laminate film and the exterior surface of the window.

20. A method as defined in claim 18, further comprising causing or allowing the aqueous liquid to dry in order for the adhesive layer to adhere to the exterior surface of the window.

21. A method as defined in claim 18, further comprising heating the protective laminate film.

22. A method of applying a protective laminate film to an exposed side of a transparent surface to protect the transparent surface from scratching or optical damage, comprising:
(a) providing or obtaining a protective laminate film comprised of:
a flexible single layer polymer substrate having a first surface and a second surface;
a scratch-resistant material forming or adhered to the first surface of the single layer polymer substrate;
a manually removable protective backing sheet adjacent to the scratch-resistant material for protecting the scratch-resistant material during handling and prior to use;
a pressure sensitive adhesive layer adjacent to the second surface of the polymer substrate; and
a release liner adjacent to the pressure sensitive adhesive layer that protects the pressure sensitive adhesive layer prior to application of the laminate film to the transparent surface,
the laminate film being flexible so as to remain optically transparent if curved or bent prior to or during installation;
(b) removing the release liner from the protective laminate film;
(c) placing the protective laminate film over the transparent surface;
(d) causing or allowing the adhesive layer to adhere to the transparent surface; and
(e) removing the backing sheet from the scratch-resistant material.

23. A method as defined in claim 22, further comprising moistening the adhesive layer of the protective laminate film with an aqueous liquid and placing the moistened adhesive layer onto the transparent surface.

24. A method as defined in claim 23, further comprising applying pressure to the protective laminate film to remove air bubbles and/or liquid from between the protective laminate film and the transparent surface.

25. A method as defined in claim 23, further comprising causing or allowing the aqueous liquid to dry in order for the adhesive layer to adhere to the transparent surface.

26. A method as defined in claim 23, further comprising heating the protective laminate film.

27. A method as defined in claim 22, the protective laminate film further comprising a second adhesive layer adjacent to the pressure sensitive adhesive layer, the second adhesive layer being adhered directly to the second surface of the polymer substrate.

28. A method as defined in claim 1, wherein the scratch-resistant coating is UV-stabilized.

29. A method as defined in claim 1, wherein the single-layer polymer substrate, scratch-resistant coating, and pressure sensitive adhesive layer together have a light transmittance across the visible spectrum greater than 97%.

30. A method as defined in claim 16, wherein the flexible polymer substrate, scratch-resistant coating, and pressure sensitive adhesive layer together have a light transmittance across the visible spectrum greater than 97%.

* * * * *